(12) United States Patent  
Chuang et al.

(10) Patent No.: US 9,336,628 B2  
(45) Date of Patent: May 10, 2016

(54) SYSTEMS AND METHODS INVOLVING SURFACE FITTING

(75) Inventors: Sue-Li Chuang, Glastonbury, CT (US); Perry Bowes, Manchester, CT (US); Steven R. Haggerty, Simsbury, CT (US)

(73) Assignee: United Technologies Corporation, Farmington, CT (US)

( * ) Notice: Subject to any disclaimer, the term of this patent is extended or adjusted under 35 U.S.C. 154(b) by 1932 days.

(21) Appl. No.: 12/116,993

(22) Filed: May 8, 2008

(65) Prior Publication Data

US 2009/0281774 A1    Nov. 12, 2009

(51) Int. Cl.
| | |
|---|---|
| G06T 17/00 | (2006.01) |
| G06T 17/20 | (2006.01) |
| G06T 17/30 | (2006.01) |
| G06T 11/20 | (2006.01) |
| G06T 19/00 | (2011.01) |

(52) U.S. Cl.  
CPC ..................................... G06T 17/30 (2013.01)

(58) Field of Classification Search  
CPC ....... G06T 11/20; G06T 11/203; G06T 15/04; G06T 17/00; G06T 17/20; G06T 17/205; G06T 17/30; G06T 19/00  
USPC .......................... 345/419, 420, 423, 441, 442  
See application file for complete search history.

(56) References Cited

U.S. PATENT DOCUMENTS

| | | | |
|---|---|---|---|
| 4,360,871 A | 11/1982 | Blaney | |
| 5,055,752 A | 10/1991 | Leistensnider et al. | |
| 5,317,682 A | 5/1994 | Luken, Jr. | |
| 5,576,492 A | 11/1996 | Phalin | |
| 5,627,949 A | 5/1997 | Letcher, Jr. | |
| 5,856,828 A | 1/1999 | Letcher, Jr. | |
| 5,926,399 A | 7/1999 | Berkooz et al. | |
| 6,181,978 B1 * | 1/2001 | Hinds et al. | 700/182 |
| 6,850,874 B1 | 2/2005 | Higuerey et al. | |
| 7,243,056 B2 | 7/2007 | Olhofer et al. | |
| 7,969,440 B1 * | 6/2011 | Polyakov et al. | 345/442 |
| 2004/0189633 A1 * | 9/2004 | Sederberg | 345/418 |
| 2005/0238244 A1 * | 10/2005 | Uzawa | 382/242 |
| 2007/0030268 A1 * | 2/2007 | Nigro | 345/420 |
| 2007/0152999 A1 * | 7/2007 | Lee et al. | 345/420 |
| 2008/0084414 A1 * | 4/2008 | Rosel et al. | 345/423 |

(Continued)

OTHER PUBLICATIONS

Piegl, L., "On NURBS: A Survey," IEEE Computer Graphics & Applications, vol. 11, pp. 55-71, Jan. 1991.*

(Continued)

*Primary Examiner* — Ke Xiao  
*Assistant Examiner* — Jed-Justin Imperial  
(74) *Attorney, Agent, or Firm* — O'Shea Getz P.C.

(57) ABSTRACT

Systems and methods involving surface fitting are provided. In this regard, a representative method includes: receiving information corresponding to discrete data points of a portion of a surface; determining curvature estimates associated with the data points prior to performing curve fitting with respect to the data points; identifying curvature shock based on the curvature estimates, the curvature shock being defined as a curvature threshold corresponding to an absolute value of curvature between adjacent data points; breaking C2 continuity between adjacent data points exhibiting curvature shock; and performing surface fitting with respect to the data points to generate Non-Uniform Rational B-Splines (NURBS) data such that breaks in the C2 continuity associated with curvature shock are maintained in the NURBS data.

1 Claim, 7 Drawing Sheets

(56) References Cited

U.S. PATENT DOCUMENTS

2008/0144045 A1* 6/2008 Bennison et al. ............. 356/614
2011/0078223 A1* 3/2011 Maekawa et al. ............. 708/270

OTHER PUBLICATIONS

Kim et al., "A curvature estimation for pen input segmentation in sketch-based modeling," Computer-Aided Design 38, Issue 3, pp. 238-248, Mar. 2006.*
Foley et al., Computer Graphics: Principles and Practice (Second Edition in C)., Addison-Wesley, Reading, MA, 1990.*
Sezgin, T.M.. Feature Point Detection and Curve Approximation for Early Processing of Free-Hand Sketches. PhD Thesis. EECS of UC Berkeley; 2001.*
Les Piegl, Wayne Tiller, "The Nurbs Book", Second Edition printed in 1997, pp. 49-51, 56-59, 364-365, 376-383, Springer Publishing, Germany.

David F. Rogers, "An Introduction to Nurbs with Historical Perspective", Copyright 2001, pp. 10-12, 48-51, 53, 69-73, 89-95, Morgan Kaufman Publishers, U.S.A.
Kruth et al. "Reverse Engineering Modeling of Free-Form Surfaces from Point Clouds Subject to Boundary Conditions", Journal of Materials Processing Technology, vol. 76, No. 1-3, Apr. 1998, pp. 120-127.
Varady et al. "Reverse Engineering of Geometric Models—an Introduction", Computer Aided Design, vol. 29, No. 4, Apr. 1, 1997, pp. 255-268.
Muller, "Krummungsbasierte Unterteilung der Hirnoberflache, Diplomarbeit", Universitat Leipzig, Fakultat fur Mathematik und Informatik, Jun. 2002, p. 1-56.
Schneider, "NURB Curves: A Guide for the Uninitiated", Mactech: The Journal of Apple Technology, No. 25, Mar. 1996, pp. 1-26.
EP Search report for EP09251284, Sep. 3, 2012.

* cited by examiner

SYSTEMS AND METHODS INVOLVING SURFACE FITTING

BACKGROUND

1. Technical Field

The disclosure generally relates to computer-aided design.

2. Description of the Related Art

Non-Uniform Rational B-Splines (NURBS) is a well-established mathematical method for creating free-form curves and surfaces in computer-aided design (CAD). In this regard, numerous CAD methodologies are available that use NURBS for fitting curves through all given data points. However, when such methodologies are used on data points exhibiting sharp curvature changes, undesirable anomalies (e.g., wrinkles) are frequently observed.

SUMMARY

Systems and Methods involving surface fitting are provided. In this regard, an exemplary embodiment of a method comprises: receiving information corresponding to discrete data points of a portion of a surface; determining curvature estimates associated with the data points prior to performing curve fitting with respect to the data points; identifying curvature shock based on the curvature estimates, the curvature shock being defined as a curvature threshold corresponding to an absolute value of curvature between adjacent data points; breaking C2 continuity between adjacent data points exhibiting curvature shock; and performing surface fitting with respect to the data points to generate Non-Uniform Rational B-Splines (NURBS) data such that breaks in the C2 continuity associated with curvature shock are maintained in the NURBS data.

Another exemplary embodiment of a method involving surface fitting comprises: estimating curvature associated with discrete data points of a surface; identifying locations at which curvature, exhibited between adjacent ones of the data points, corresponds to a curvature threshold; applying double knots at the locations to break C2 continuity at the locations identified; and performing surface fitting with respect to the data points to generate Non-Uniform Rational B-Splines (NURBS) data such that breaks in the C2 continuity associated with the double knots are maintained in the NURBS data.

An exemplary embodiment of a system involving surface fitting is configured to perform method steps comprising: receiving information corresponding to discrete data points of a portion of a surface; determining curvature estimates associated with the data points prior to performing curve fitting with respect to the data points; identifying curvature shock based on the curvature estimates, the curvature shock being defined as a curvature threshold corresponding to an absolute value of curvature between adjacent data points; breaking C2 continuity between adjacent data points exhibiting curvature shock; and performing surface fitting with respect to the data points to generate Non-Uniform Rational B-Splines (NURBS) data such that breaks in the C2 continuity associated with curvature shock are maintained in the NURBS data.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods involving surface fitting are provided, several exemplary embodiments of which will be described in detail. In this regard, various undesirable anomalies (e.g., wrinkles) can be reduced in free-form curves associated with periodic (closed-loop) shapes that can be reduced in Non-Uniform Rational B-Splines (NURBS) curves. In some embodiments, this is accomplished by breaking C2 continuity at locations between data points that exhibit variations in curvature that are larger in magnitude than desired. In some embodiments, when such a location is identified, the knot value of one of the data points can be duplicated for that of the next adjacent data point, for example. Notably, a one to one correspondence can be exhibited between knot values and data points.

Figure 1:
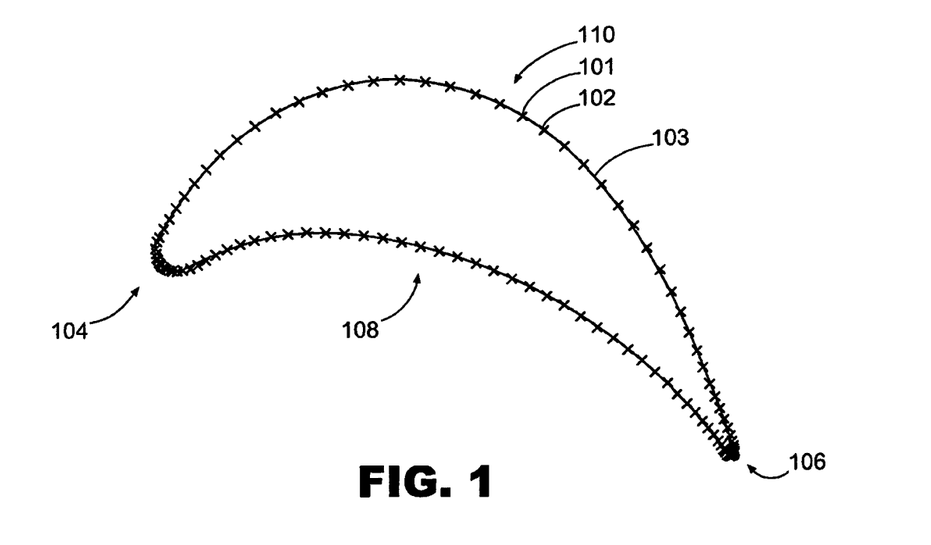
FIG. 1 is a schematic diagram depicting a representative set of data points and a corresponding fit curve.

Referring now in greater detail to the drawings, FIG. 1 is a schematic diagram depicting a representative set of data points and a curve. Specifically, the data points (e.g., data points 101 and 102) correspond to a surface (not shown), with curve 103 having been curve-fit through the data points. Notably, the surface from which the data points were obtained is an airfoil and, as such, is a closed-loop (periodic) shape with the beginning and end of the shape being co-located. Correspondingly, curve 103 exhibits a leading edge 104, a trailing edge 106, a pressure side 108 and a suction side 110 that represent portions of the surface.

Data points can be obtained in various manners. By way of example, in some embodiments, an object with a target surface (e.g., a gas turbine engine component with an airfoil) can be analyzed to determine locations of the data points representative of the surface.

With respect to the acquisition of data points of a surface, in some embodiments, more data points can be obtained in locations that exhibit more curvature. Thus, in the case of an airfoil (in a chordwise direction, such as shown in FIG. 1), more data points can be obtained with respect to the leading edge and the trailing edge than with respect to the pressure side and the suction side. In a spanwise direction (a direction orthogonal with respect to the image of FIG. 1), fewer data points can be acquired in some embodiments. Note also that, in the spanwise direction, the shape can be considered open (non-periodic).

Figure 2:
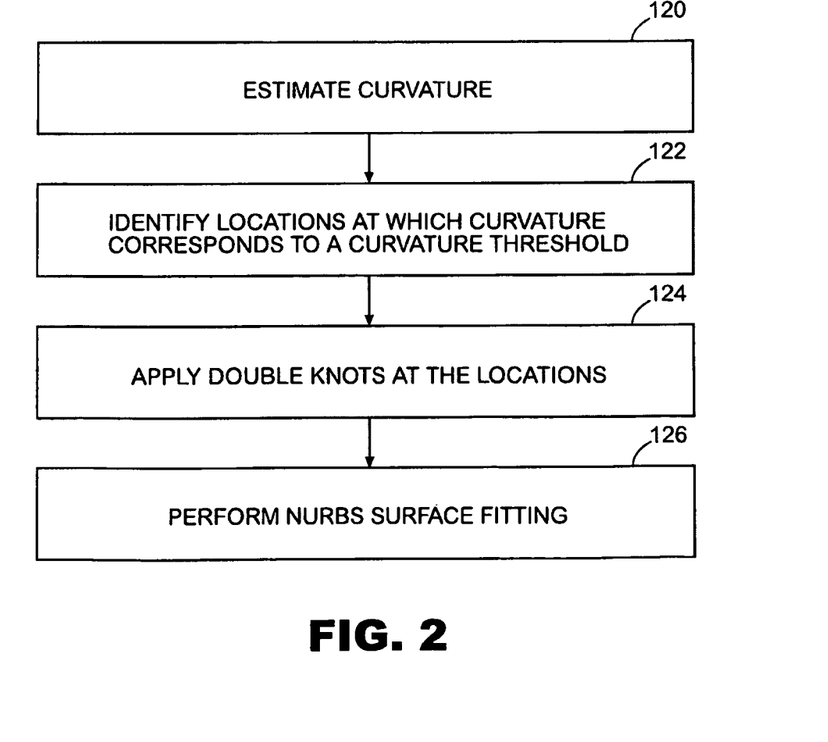
FIG. 2 is a flowchart depicting an exemplary embodiment of a method involving curve fitting.

FIG. 2 is a flowchart depicting an exemplary embodiment of a method involving surface fitting. As shown in FIG. 2, the method may be construed as beginning at block 120, in which curvature associated with discrete data points of a surface is estimated. In block 122, locations are identified at which curvature between adjacent data points corresponds to a curvature threshold. In block 124, double knots are applied at the locations to break C2 continuity at the locations identified.

In this regard, when two curves are connected at a location (x, y, z), those curves are considered coincident (i.e., exhibit C0 continuity). If those curves are also parametric with respect to a parameter t, the curves exhibit C1 continuity if the first derivatives (dx/dt, dy/dt, dz/dt) are identical at location (x, y, z). C2 continuity exists if the second derivative is also identical. Additionally, double knots are defined as a unique value assigned to two consecutive elements in a knot vector. For more information on continuity, knots and related topics, see (Reference 1): The NURBS Book by Les Piegl and Wayne Tiller, $2^{nd}$ Edition, Springer, 1997 and (Reference 2): An Introduction to NURBS with Historical Perspective by David F. Rogers, Academic Press, 2001, each of which is incorporated herein by reference.

In block 126, surface fitting with respect to the data points to generate Non-Uniform Rational B-Splines (NURBS) data. Specifically, the NURBS data maintains the breaks in the C2 continuity associated with the double knots. In some embodiments, B-Splines curve-fitting is performed to the data points to generate the NURBS data (notably, B-Splines is the non-rational subset of NURBS).

Figure 3:
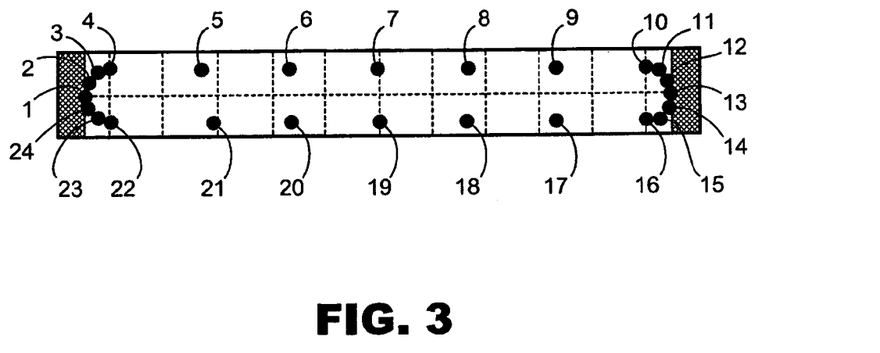
FIG. 3 is a schematic diagram depicting another representative set of data points.

FIG. 3 is a schematic diagram depicting another representative set of data points. In particular, FIG. 3 represents a periodic surface from which 24 data points have been acquired. Notably, the data points are plotted in a Cartesian coordinate system in the x-y plane.

Figure 4:
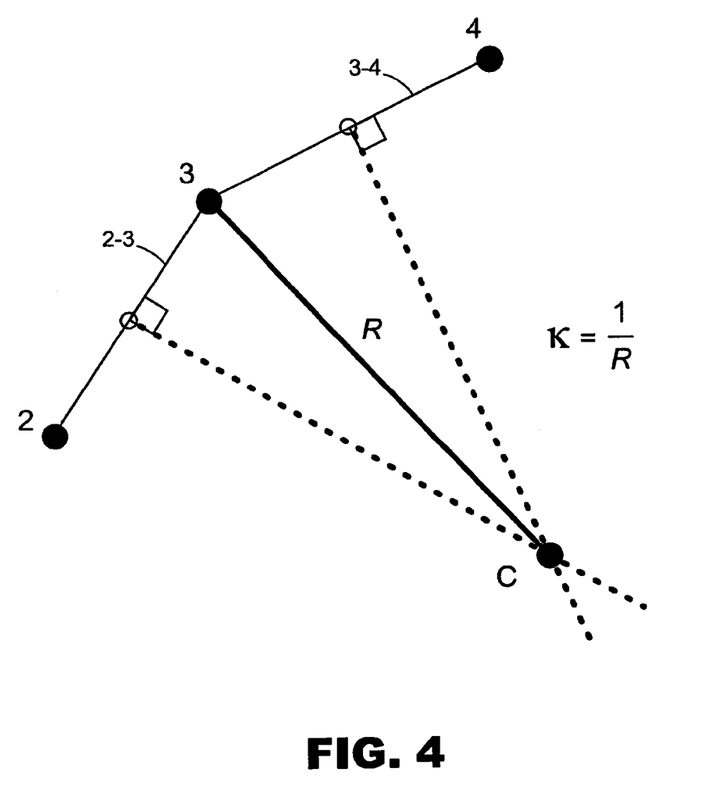
FIG. 4 is a schematic diagram depicting an exemplary technique for performing curvature estimation.

FIG. 4 is a schematic diagram depicting an exemplary technique for performing curvature estimation with respect to an arbitrary data point of FIG. 3. As shown in FIG. 4, line 2-3 interconnects points 2 and 3, and line 3-4 interconnects points 3 and 4. Corresponding perpendicular (dashed) lines extend from the midpoints of lines 2-3 and 3-4, respectively, with an intersection of the perpendicular lines defining a point C. Notably, radius R is defined as the distance between point 3 and point C, with the curvature at point 3 being defined as the inverse of the radius (1/R).

Figure 5:
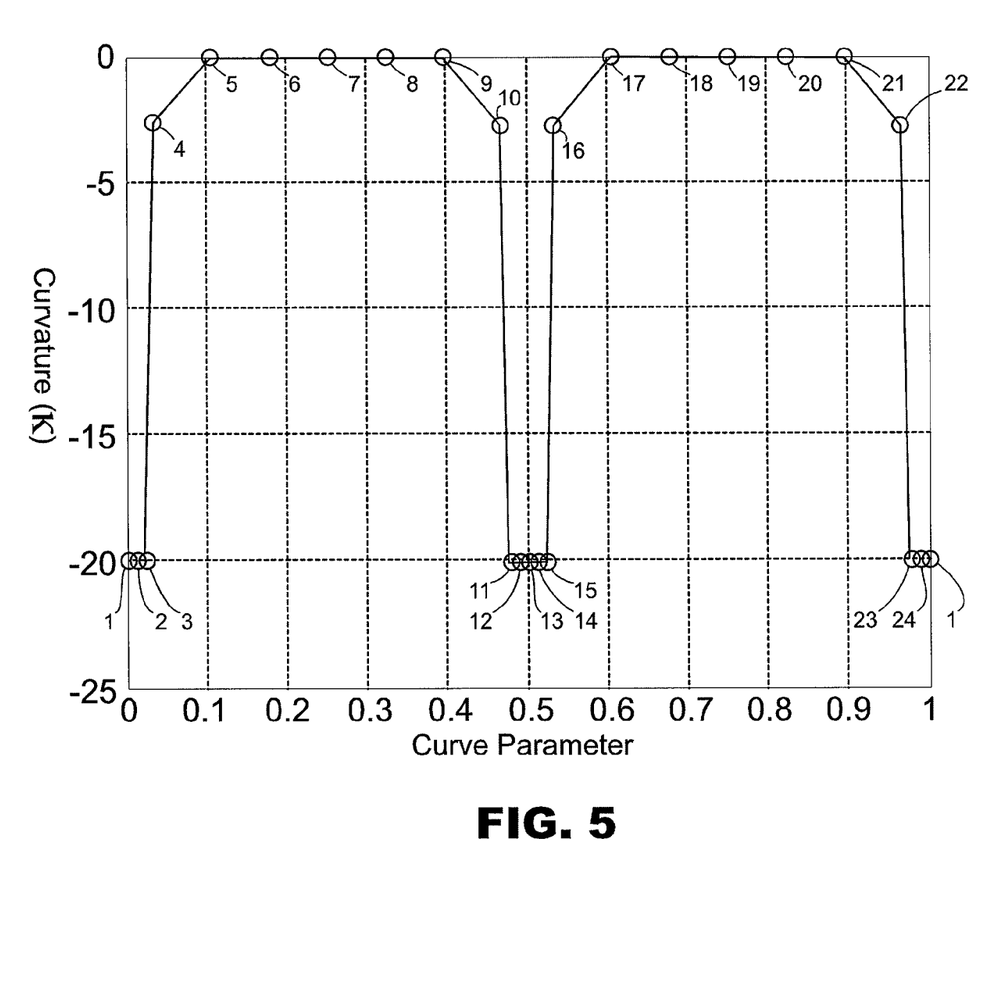
FIG. 5 is a graph depicting Curvature versus Curve Parameter with respect to the data points of FIG. 3.

Results of estimating curvature by the aforementioned technique are depicted in FIG. 5, which is a graph depicting Curvature versus Curve Parameter. Notably, curve parameter ranges from 0 to 1 about the exterior of a closed shape.

As shown in FIG. 5, curvature of the data points is estimated to be consistent (e.g., constant) between points 1 and 3, between points 11 and 15, and again between points 23 and 1 at a value of −20. Additionally, curvature of the data points is estimated to be consistent between points 5 and 9, and points 17 and 21 at a value of 0. Between points 3 and 4, 10 and 11, 15 and 16, and 22 and 23, the curvature is estimated to change most abruptly, with changes of lesser magnitude being exhibited between points 4 and 5, 9 and 10, 16 and 17, and 21 and 22.

Figure 6:
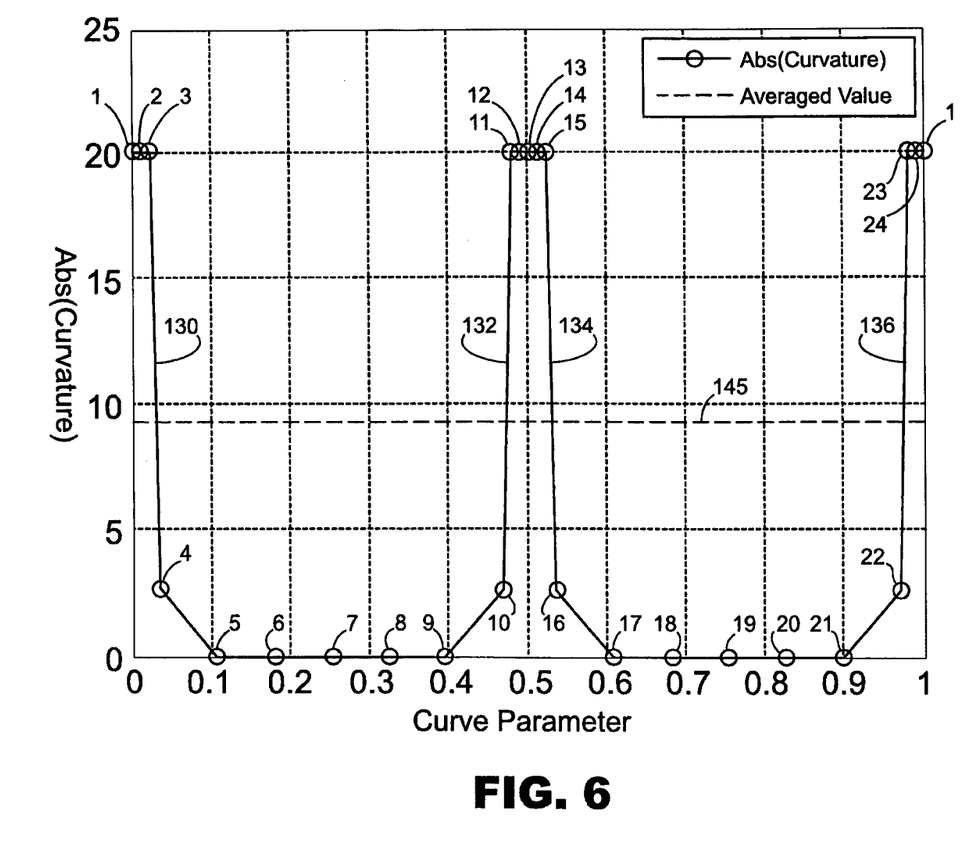
FIG. 6 is a graph depicting Absolute Curvature versus Curve Parameter with respect to the data points of FIG. 3.

The relative magnitude of curvature change can be seen more clearly with reference to FIG. 6, which is a graph depicting Absolute Curvature versus Curve Parameter. As shown in FIG. 6, locations 130, 132, 134 and 136 (which occur between points 3 and 4, 10 and 11, 15 and 16, and 22 and 23, respectively) exhibit curvature shock. Curvature shock is defined as a characteristic of a location at which at least a threshold value of curvature change is exhibited between adjacent data points. In this case, curvature shock is exhibited at a location between adjacent data points if the local change in curvature exceeds a predetermined curvature threshold. By way of example, the curvature threshold can be selected as the absolute value of curvature for all of the data points. In FIG. 6, such a curvature threshold is depicted by dashed line 145. Thus, lines interconnecting adjacent data points and crossing the curvature threshold represent locations of curvature shock.

As mentioned previously, conventional NURBS curve fitting can result in undesirable anomalies (e.g., wrinkles). Such abnormalities tend to occur at locations exhibiting curvature shock. In this regard, FIG. 7 is a graph depicting a subset of the data points of FIG. 3 showing curve fitting using conventional NURBS.

Figure 7:
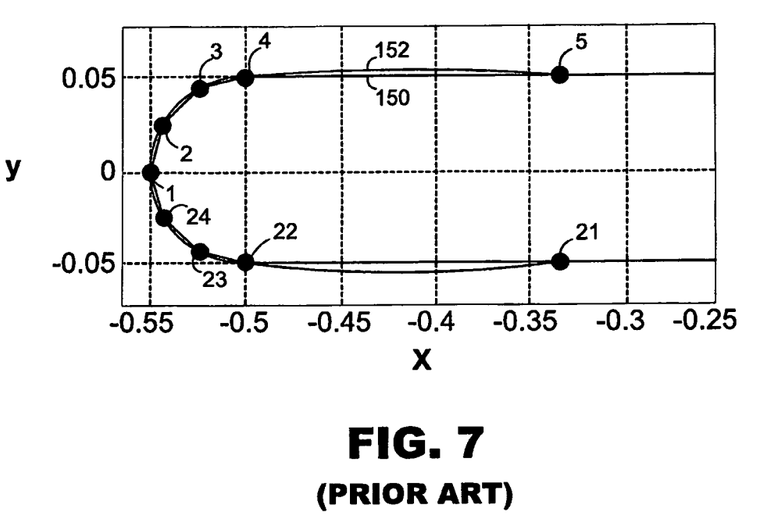
FIG. 7 is a graph depicting a subset of the data points of FIG. 3 showing curve fitting using conventional NURBS.

In FIG. 7, line 150 extending between data points 4 and 5 accurately represents the curvature between those data points. In contrast, line 152 shows the result of curvature shock present in the interpretation of the data points using conventional NURBS curve fitting. Note that line 152 is displaced from line 150, with the displacement between the lines representing the undesirable feature of a wrinkle introduced by conventional NURBS.

Notably, there are two general types of curve- or surface-fitting methods. One is approximation by which the resulting curves do not necessarily go through all the given data points. The other is interpolation by which the resulting curves go through all the given data points. For the purpose of this disclosure, only the latter is considered. Conceptually, there is no error for curve- or surface-fitting using the interpolation method because the fitted curves/surfaces pass through all the given data points. Thus, errors are identically zeros.

In order to improve the behavior of NURBS curve fitting, locations exhibiting curvature shock are modified. In some embodiments, locations exhibiting curvature shock are changed by modifying knot values of at least one of the data points associated with the curvature shock. As used herein, a knot value is a value assigned to an element of a knot vector (for example, see Reference 2 at page 53).

By way of example, a data point associated with curvature shock can have its knot value replaced by the knot value of an adjacent data point, provided that that data point exhibits a lower curvature value than the adjacent data point on the other side of the curvature shock. Stated differently, the knot value at the curvature shock location can take on the knot value of the adjacent data point on the flatter side of the curve.

Figure 8:
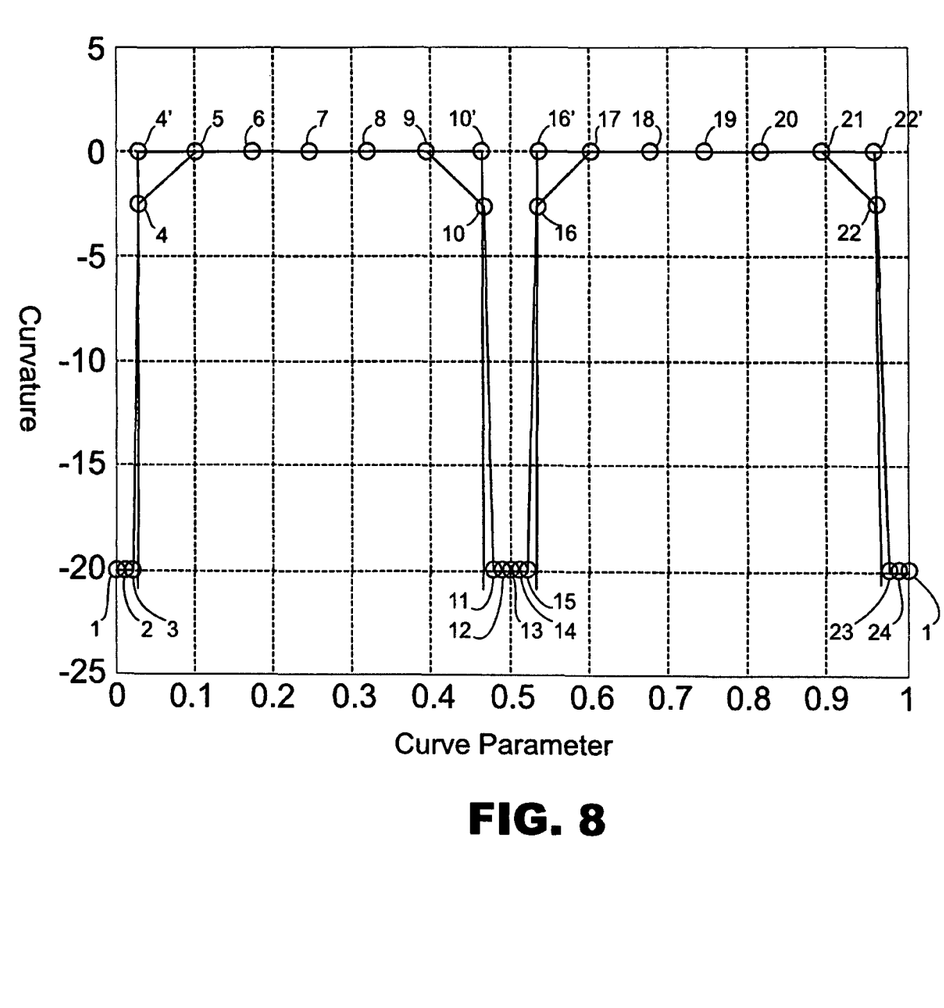
FIG. 8 is a graph depicting Curvature versus Curve Parameter with respect to the data points of FIG. 3 after breaking C2 continuity at locations of curvature shock.
Figure 9:
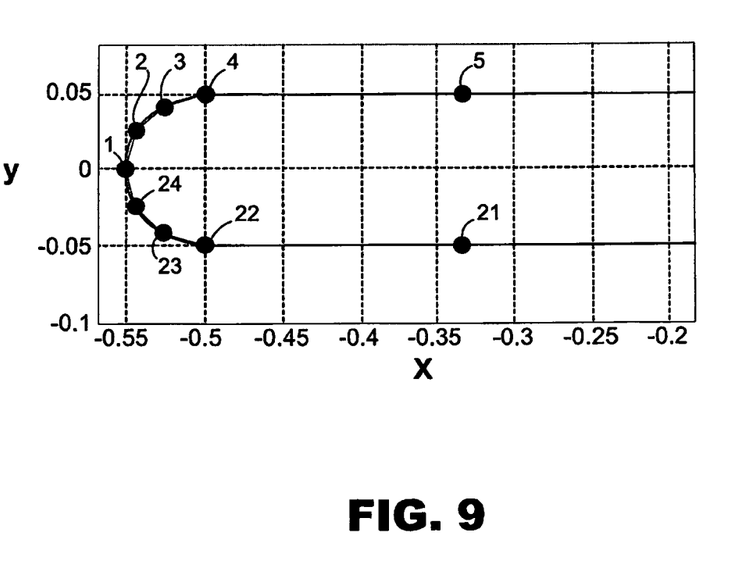
FIG. 9 is a graph depicting a subset of the data points of FIG. 3 showing curve fitting using an exemplary embodiment of a method involving surface fitting.

In this regard, FIG. 8 is a graph depicting Curvature versus Curve Parameter with respect to the data points of FIG. 3 showing modification of data points associated with curvature shock. As shown in FIG. 8, the following sets of data points exhibit curvature shock, points 3 and 4, points 10 and 11, points 15 and 16, and points 22 and 23. As mentioned above, in some embodiments, the curvature shock can be accommodated by replacing knot values of the data points located on the flatter sides of the shocks. Since data points 4, 10, 16 and 22 are located closest to the 0 curvature line, these points are located on the flatter sides of the shocks. Replacing of the curvature values of these data points is represented by points 4', 10', 16' and 22', in which curvature values of the corresponding adjacent data points are used. Results of the substitution are depicted graphically in FIG. 9, which shows a subset of the data points of FIG. 3. In this regard, the knot values associated with the original data points are [ . . . 0.0000, 0.0112, 0.0224, 0.0336, 0.1057, 0.1779, 0.2500, 0.3221, 0.3943, 0.4664, 0.4776, 0.4888, 0.5000, 0.5112, 0.5224, 0.5336, 0.6057, 0.6779, 0.7500, 0.8221, 0.8943, 0.9664, 0.9776, 0.9888 . . . ]. The knot values after applying the double knots at Points 4 and 22 are, [ . . . 0.0000, 0.0112, 0.0224, 0.0336, 0.0336, 0.1779, 0.2500, 0.3221, 0.3943, 0.4664, 0.4776, 0.4888, 0.5000, 0.5112, 0.5224, 0.5336, 0.6057, 0.6779, 0.7500, 0.8221, 0.9664, 0.9664, 0.9776, 0.9888 . . . ]. For more information regarding complete knot vectors of closed curves, see Reference 2 at pages 69-73, for example.

Figure 10:
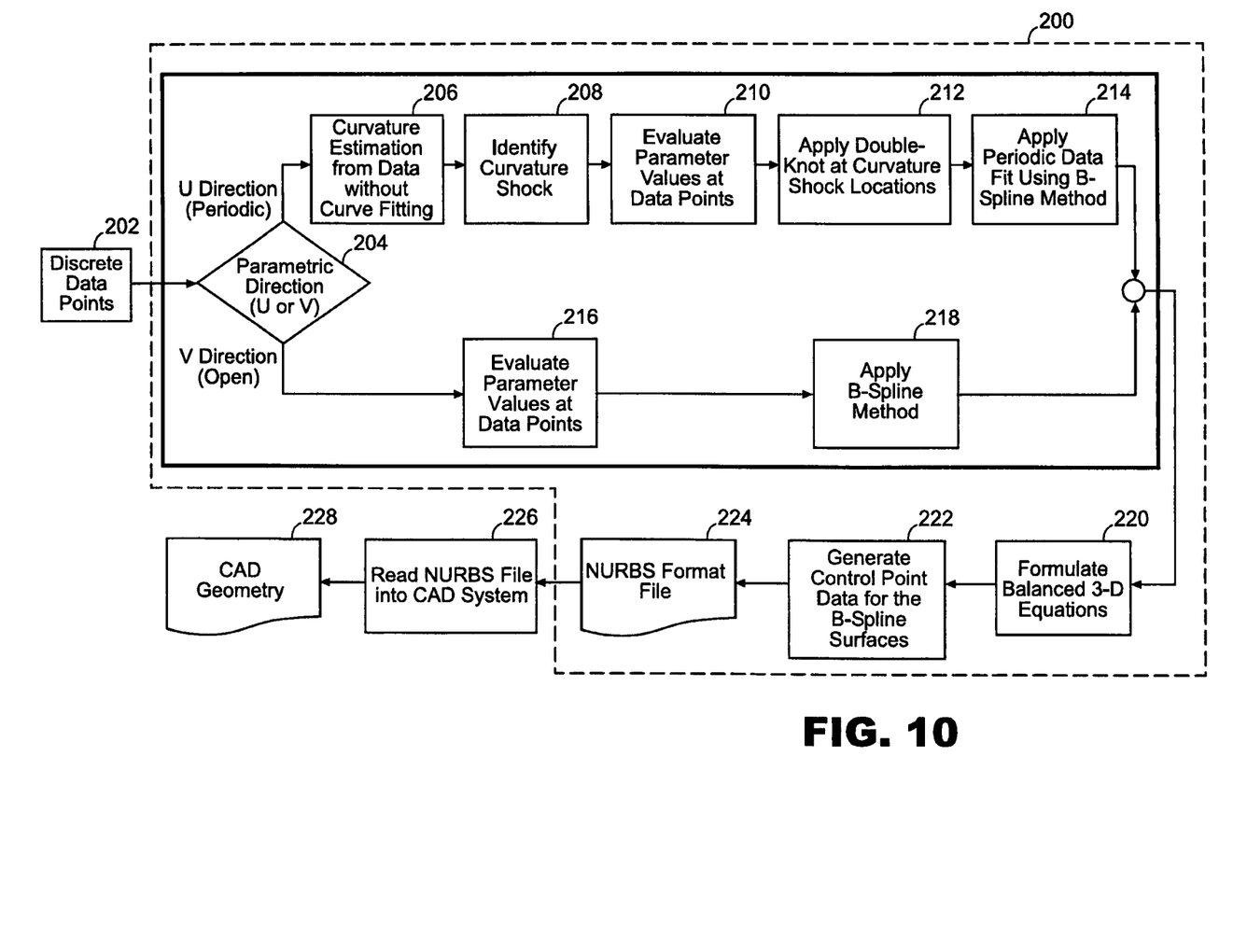
FIG. 10 is a schematic diagram depicting an exemplary embodiment of a system involving surface fitting and related functionality.

FIG. 10 is a schematic diagram depicting an exemplary embodiment of a system involving surface fitting and related functionality. As shown in FIG. 10, system 200 is operative to perform functional steps that are generally described hereafter as pertaining to a method. That method, which is an exemplary embodiment of a method involving surface fitting, may involve steps performed by system 200 and/or by other systems. However, for the purpose of describing the exemplary embodiment of system 200, the functional steps depicted in blocks 204, 206, 208, 210, 212, 214, 216, 218, 220, 222 and 224 are to be construed as being performed by system 200.

In this regard, the method may be construed as beginning at block 202, in which information corresponding to discrete data points is received. By way of example, the data points can correspond to locations associated with a surface. System 200 receives the information and, as depicted in block 204, a determination is made as to whether a subset of the data points is non-periodic (open) or closed. If it is determined that the subset of data points is periodic (e.g., the chordwise, x-y plane cross-section of an airfoil), system 200 performs curvature estimation in block 206 without regard to performing curve fitting. Notably, since an infinite number of curves can be fitted to the same discrete data points, curvature values depend on the type of curve fitting routine utilized. By employing curvature estimation without regard to a fitted curve, unique, repeatable curvature values can be obtained.

System 200 identifies locations associated with curvature shock (if any) in block 208. System 200 then evaluates parameter values at the data points in block 210. For instance, one such algorithm involves using the normalized chord length [see Reference 1, for example, at page 364].

Double knots are applied at locations of curvature shock and periodic data fit is applied using a B-Spline method (blocks 212, 214). With respect to data fitting, further information can be found at Reference 2, for example, at pages 89-95.

Returning briefly to block 204, if it is determined that the subset of data points is open (e.g., the spanwise, z direction of an airfoil), the process proceeds to block 216, in which parameter values are evaluated at the data points. Thereafter, such as depicted in block 218, the B-Spline method is applied.

From blocks 218 and 214, the process proceeds to block 220, in which balance 3-D equations are formulated. Then, in block 222, control point data for the B-Spline surfaces are generated. In particular, control points and an associated knot vector are generated. Notably, a knot vector is a sequence of parameter values that specify parameter intervals of patches that constitute a NURBS surface. The form of the equations can be found in Reference 1, for example, at pages 376-382.

In block 224, the generated data is configured in a NURBS data file format by system 200 so that the file can be utilized by a CAD system (depicted in block 226). By way of example, the NURBS file can contain one or more of the following: surface profile data (e.g., internal or external, number, NURBS surface or curve), number of control points in the u and v directions, listing of the control points for the surface (e.g., x, y, z, w), listing of the knot vectors in the u and v directions, degree of the surface in the u and v directions, whether or not the surface is rational, where rational status (e.g., homogenous or polynomial), design parameters for editing the surface (e.g., upstream or downstream design parameters), among others. Additionally, the NURBS data file can be represented in one or more of several formats. By way of example, the NURBS data file can be represented in XML, plain text, tab delimited, comma delimited, and XLS, among others.

As shown in block 228, utilization by a CAD system results in the creation of a CAD representation of the original surface from which the data points were obtained. Notably, representing a surface in the aforementioned manner ensures that a resultant CAD representation is accurate and reproducible. This enables data points other than the original data points to be extracted from the CAD representation.

Various functionalities, such as those described above in the flowcharts, can be implemented in hardware and/or software. In this regard, a computing device can be used to implement various functionalities, such as those depicted in FIGS. 2 and 10.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or non-volatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. A computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method involving surface fitting with a computer, comprising steps of:
   receiving information corresponding to discrete data points of a portion of a surface;
   determining curvature estimates associated with the data points prior to performing curve fitting with respect to the data points;
   identifying curvature shock by comparing the curvature estimates to a curvature threshold corresponding to an absolute value of curvature between adjacent data points;
   breaking C2 continuity at a first of the adjacent data points exhibiting curvature shock; and
   performing surface fitting using interpolation with respect to the data points to generate Non-Uniform Rational B-Splines (NURBS) data such that breaks in the C2 continuity associated with curvature shock are maintained in the NURBS data, and to generate a B-Spline surface that passes through each of the data points;
   wherein the steps of determining the curvature estimates, identifying the curvature shock, breaking the C2 continuity, and performing the surface fitting are performed by the computer, and
   wherein the curvature threshold is an absolute value of curvature for the data points of the portion of the surface.

* * * * *